United States Patent [19]

Tucker

[11] Patent Number: 5,518,348

[45] Date of Patent: May 21, 1996

[54] PROTECTIVE DEVICE

[75] Inventor: Gary Tucker, Snohomish, Wash.

[73] Assignee: Corner Buddy, Inc., Woodinville, Wash.

[21] Appl. No.: 345,228

[22] Filed: Nov. 28, 1994

Related U.S. Application Data

[63] Continuation of Ser. No. 33,845, Mar. 19, 1993, abandoned.

[51] Int. Cl.$^6$ .............................. B60P 7/06; B61D 45/00
[52] U.S. Cl. ................................. 410/99; 410/41
[58] Field of Search ................... 410/41, 85, 99, 410/155; 24/16 R, 115 K, 129 B; 206/453, 586; 248/345.1

[56] References Cited

U.S. PATENT DOCUMENTS

| | | | |
|---|---|---|---|
| 968,455 | 8/1910 | Eastabrook | 410/41 |
| 1,003,108 | 9/1911 | Hinrichs | 410/41 |
| 1,897,138 | 2/1933 | North | 410/99 |
| 3,152,693 | 10/1964 | Anderson | 410/99 X |
| 4,525,113 | 6/1985 | Colman | 410/99 X |
| 4,526,500 | 7/1985 | Patrick | 410/99 X |
| 4,639,977 | 2/1987 | Howard | 24/16 R |

Primary Examiner—William E. Terrell
Assistant Examiner—Stephen Gordon
Attorney, Agent, or Firm—Hughes, Multer & Schacht

[57] ABSTRACT

Systems usable for such diverse applications as tying artifacts to supports, bundling objects into a structurally stable unit, and assembling system components. Those systems include a flexible restraint such as a rope, cord, wire, or strap and dislodgement resisting, rigid or semirigid protective devices. These devices: (a) can be directly assembled to the restraint at any desired location therealong, and (b) protect the artifact and/or the restraint against damage, even in the face of vibration, jarring, and careless handling of the artifact or the flexible restraint.

5 Claims, 3 Drawing Sheets

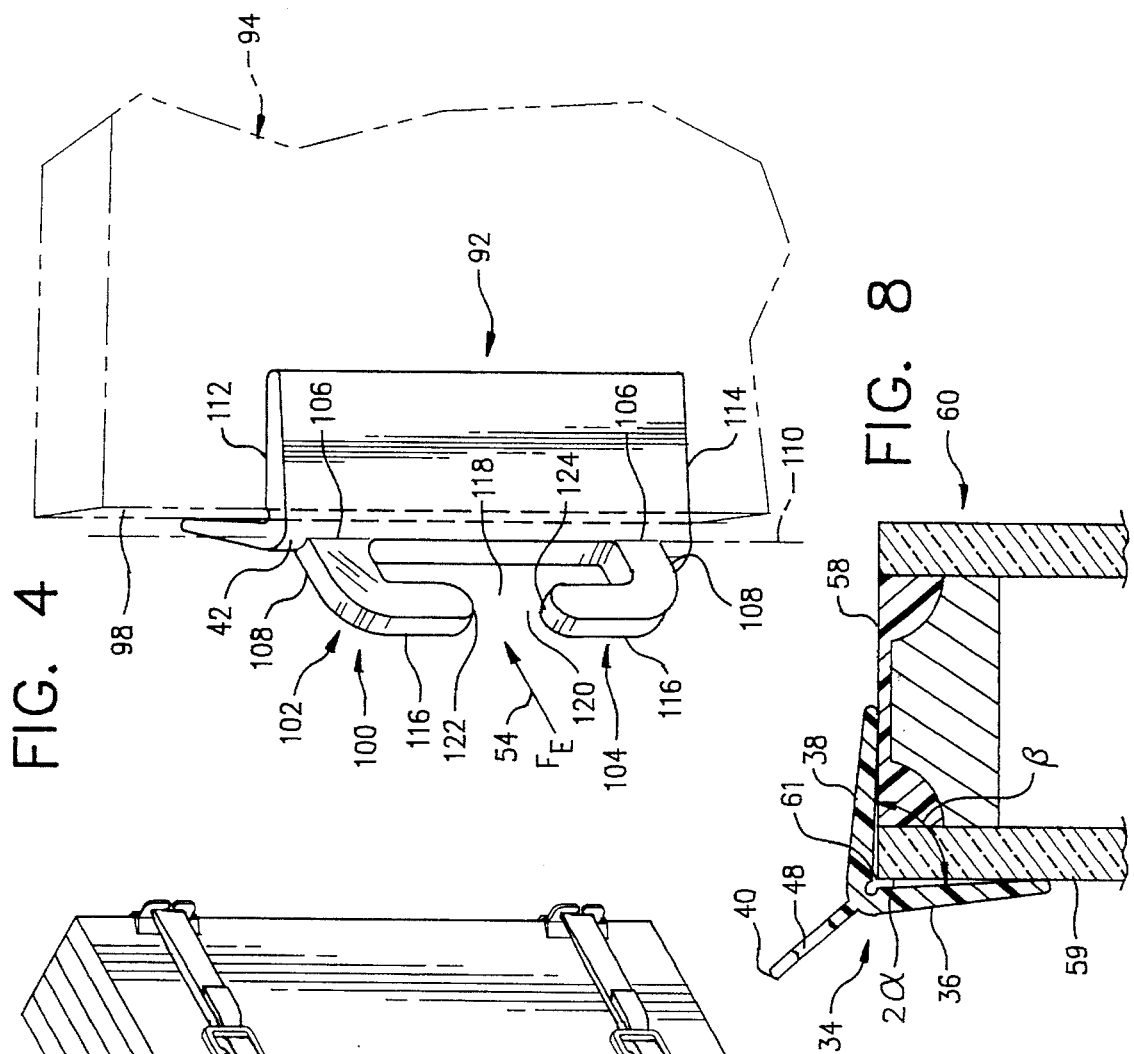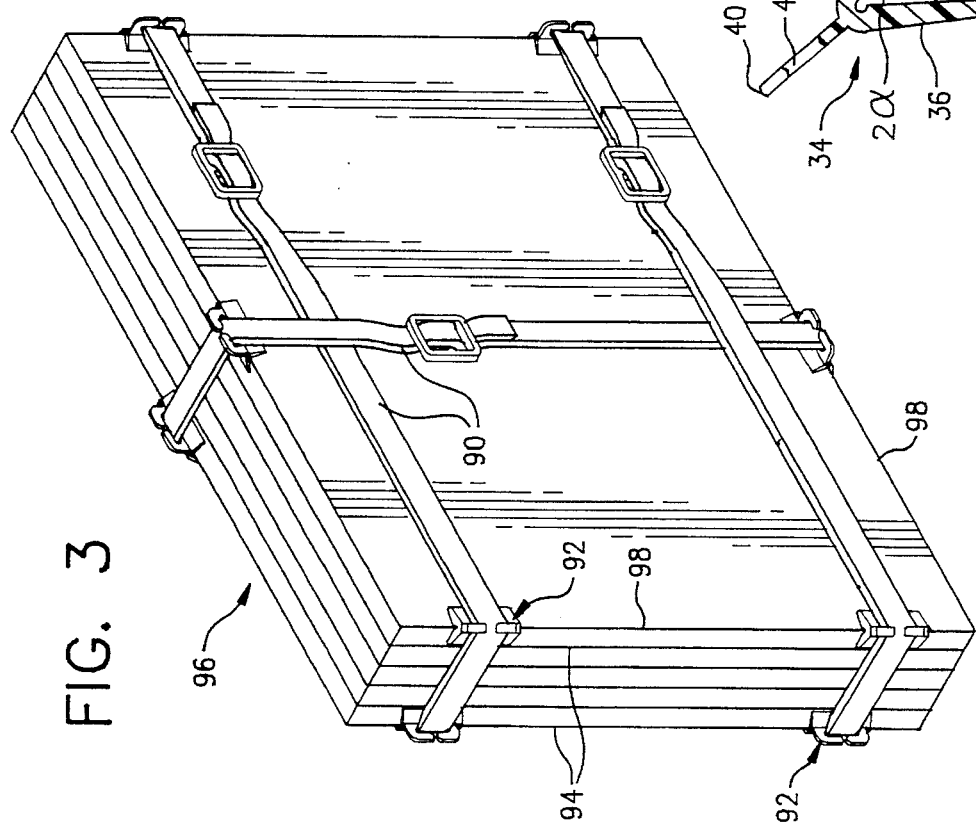

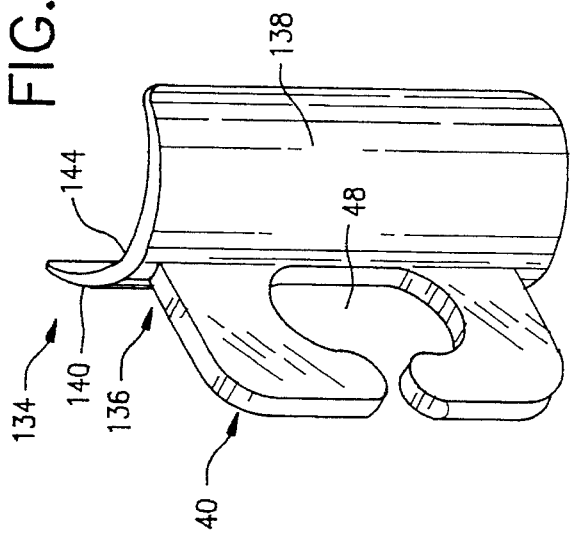
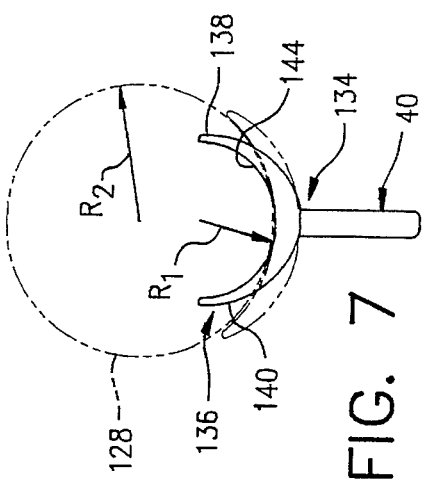
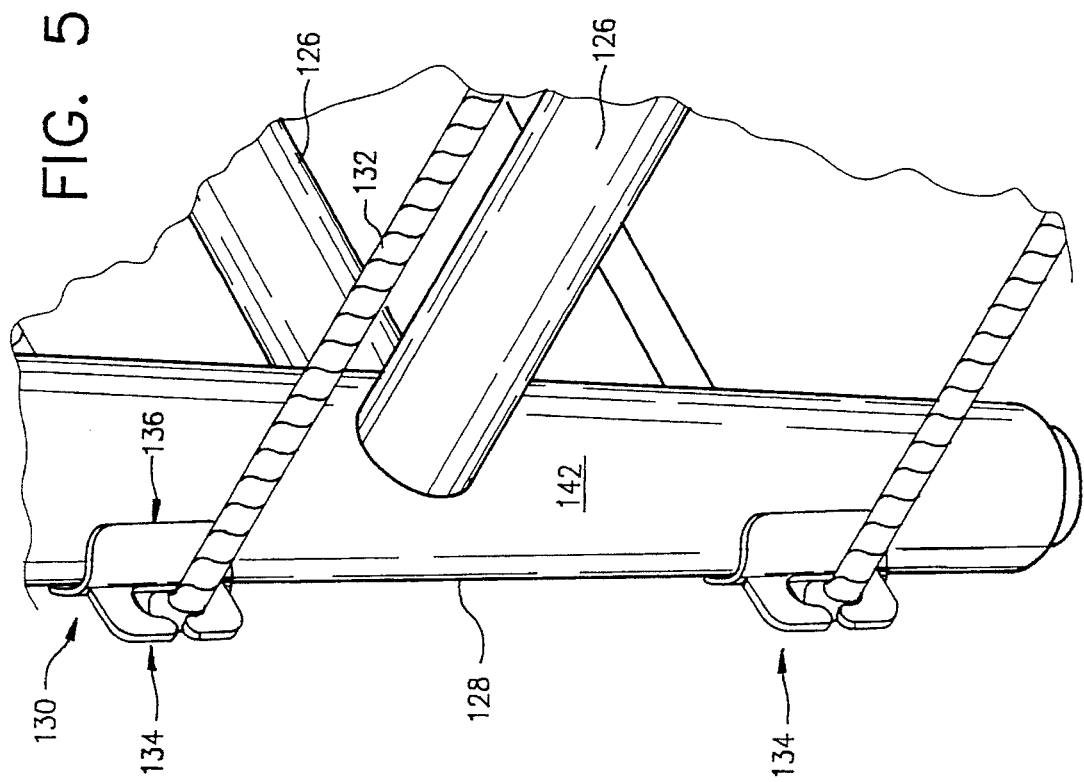

5,518,348

PROTECTIVE DEVICE

This is a continuation of application Ser. No. 08/033,845 filed on Mar. 19, 1993 and now abandoned.

TECHNICAL FIELD OF THE INVENTION

In one aspect, the present invention relates to novel, improved methods for securing artifacts to each other and/or to supports with flexible restraints such as ropes and straps.

In another aspect, the present invention relates to novel, improved devices for protecting the secured artifact or the restraint or both from damage.

DEFINITIONS

"Artifact" is used herein in a perhaps somewhat special sense to include aggregations of objects such as sheets of glass or components of a framework as well as individual objects such as a single sheet of glass, a window, a piece of furniture, etc.

"Bundling" is used in this specification to refer to the packaging of artifacts with flexible restraints.

"Assembling" is a similar technique, but the goal is to hold the components of a structure or system in an assembled, operative, spatial relationship.

The assembling of artifacts to supports with flexible restraints is referred to as "tying".

BACKGROUND OF THE INVENTION

The transporting of artifacts often requires that the artifacts be tied to the bed of a vehicle or vehicle-mounted support and/or that artifacts be bundled to facilitate handling and transport. Typically, a flexible restraint such as a rope or strap is employed for these purposes.

Particularly where the restraint is trained around a corner of the artifact, this may result in denting, abrasion, and other forms of damage to the artifact. Also, if the corner is sharp and the artifact is hard as is case with a sheet of glass, for example, the restraint itself may be damaged, even to the point where it parts and allows the artifact to come free and suffer damage.

The problem is particularly acute in the transportation of artifacts. Vibration is perhaps universally encountered in moving vehicles. This leads to relative movement between the artifact and the flexible restraint, typically in a sawing fashion. This aggravates the possibility of damage to the artifact and/or the restraint.

A variety of devices for protecting the artifact or the flexible restraint in applications of the character just described have been proposed. Those known to applicant are disclosed in U.S. Pat. No. 4,639,977 issued Feb. 3, 1987 to Howard for COMBINATION ROPE GUARD AND ROPE BUNDLE KEEPER; in U.S. Pat. No. 5,056,664 issued Oct. 15, 1991 to Demers for CORNER PROTECTOR APPARATUS; and in those patents cited and discussed in column 1 of Demers.

Neither the Demers device nor that disclosed by Howard are considered by applicant to be at all practical for the applications discussed above.

The Demers device is a thin, flexible strip fabricated from leather or a polymeric material. It would be as susceptible to wear as a strap-type restraint and could be easily and severely damaged, particularly during shipment and under other circumstances in which vibration is present. The sharp corner of a piece of glass, for example, could damage a Demers-type protector to the extent that a protected restraint could be exposed and damaged. Furthermore, the Demers device can only be assembled to an associated, flexible restraint from one end of that component. The protective device must then be slid along the restraint to the location where it is to be employed. This may be totally impractical—for example, where the restraint is long, where a number of protective devices are required, or where the restraint is already at least partially in place and the devices can accordingly not readily be displaced along it to the locations where they are needed.

Furthermore, in typical applications such as that shown in FIG. 5 of Demers, the protective device only engages one surface of the artifact being tied down. Frictional forces may as a consequence be low enough to allow unwanted slippage.

The Howard device has all the disadvantages of Demers' including susceptibility to damage except for slits which allow the device to be assembled to an associated restraint without threading the latter through the protective device. However, the thin leather or comparable material from which the Howard device is made would allow it to be easily dislodged from the associated restraint both in tying down or bundling artifacts and in the subsequent removal and handling of the flexible restraint.

Drawbacks of the character discussed above also exist in available systems which employ flexible restraints such as ropes and cables to hold components in an assembled, operative relationship.

In short, there is an existent and continuing need for improved protective devices designed to eliminate damage to bundled, assembled, or tied down artifacts and/or the flexible restraints that are employed to tie down, bundle, or assemble the artifact.

SUMMARY OF THE INVENTION

Such devices have now been invented and are disclosed herein. They differ from the protective devices disclosed by Demers and Howard in that they are fabricated from a rigid or semirigid material, rather than a flexible one. A unique, apertured, keeper element allows the protective device to be installed on a flexible restraint at any location therealong without training the end of restraint through the device. This keeper element also ensures that the device will not be dislodged, once it is installed.

The rigid or semirigid polymeric material from which the device is fabricated offers much more resistance to damage from the sharp edges of glass and the like than the thin leather or plastic straps of Howard or Demers. This material also provides a greater degree of protection to the artifact because the device is not deformed to an extent capable of causing dents or other damage when the restraint is tightened or subsequently vibrated, jarred, or jostled, even if the restraint is a thin rope, wire, or the like.

Aside from the foregoing, the novel protective devices disclosed herein employ a unique configuration which provides increased frictional contact between the device and the artifact during tying down, assembling, and bundling of an artifact and any subsequent transportation. This minimizes detrimental shifting of the bundle, assembly, or tied down artifact, even if the artifact is jarred or subjected to vibration of a high magnitude.

Loads imposed on the protective devices disclosed herein have a vector such that the force clamps the protective device against the artifact being tied, assembled, or bundled. This also significantly reduces the possibility of the protective device slipping. Slippage can additionally be minimized by so configuring the device so that its artifact-engaging elements will be deformed into wide area engagement with the artifact as the flexible restraint is tightened and the clamping force applied.

Yet another significant and practical advantage of the novel protective devices disclosed herein is their versatility. For example, they can readily be configured for use with panels, sheets, and other artifacts having flat edges meeting at a sharp corner or for use with pipe, tubing, and other cylindrical components. They can be employed for such diverse purposes as tying artifacts to supports, bundling them into structurally integral units, and maintaining the components of various structures in an assembled, operative, spatial relationship. The latter capability solves a problem that neither Demers nor Howard address.

The objects and features of the present invention will be apparent to the reader from the foregoing and the appended claims and as the ensuing detailed description and discussion of the invention proceeds in conjunction with the accompanying drawings.

BRIEF DESCRIPTION OF THE DRAWINGS

FIG. 3 is a generally pictorial view, showing how a flexible restraint and protective devices employing the principles of the present invention can be employed to bundle sheets of a material such as dry wall or plywood into a single, structurally integral unit;

FIG. 4 is a perspective view of a second protective device embodying the principles of the present invention; this device differs from that shown in FIG. 2 primarily in that it is designed to be employed with relatively wider flexible restraints such as straps rather than the ropes, cords, or wire for which the FIG. 2 device is designed;

FIG. 5 is a partial, generally pictorial view of a structural framework with components held in an operative, spatial relationship by a flexible restraint and protective devices employing the principles of the present invention;

FIG. 6 is a perspective view of the protective device employed in the system of FIG. 5; it differs from the protective devices illustrated in FIGS. 2 and 4 primarily in that it is configured for use with a cylindrical artifact rather than a parallelepipedal artifact;

FIG. 7 shows how the semirigid protective device of FIG. 6 is deformed by the application of a clamping force to conform to the exterior surface of the tubular component with which it is in contact; and FIG. 8 is a fragmentary section through a double pane window, showing the relationship between a protective device as shown in FIG. 2 and a corner of the window before the protective device is clamped to the window.

DETAILED DESCRIPTION OF THE INVENTION

Figure 1:
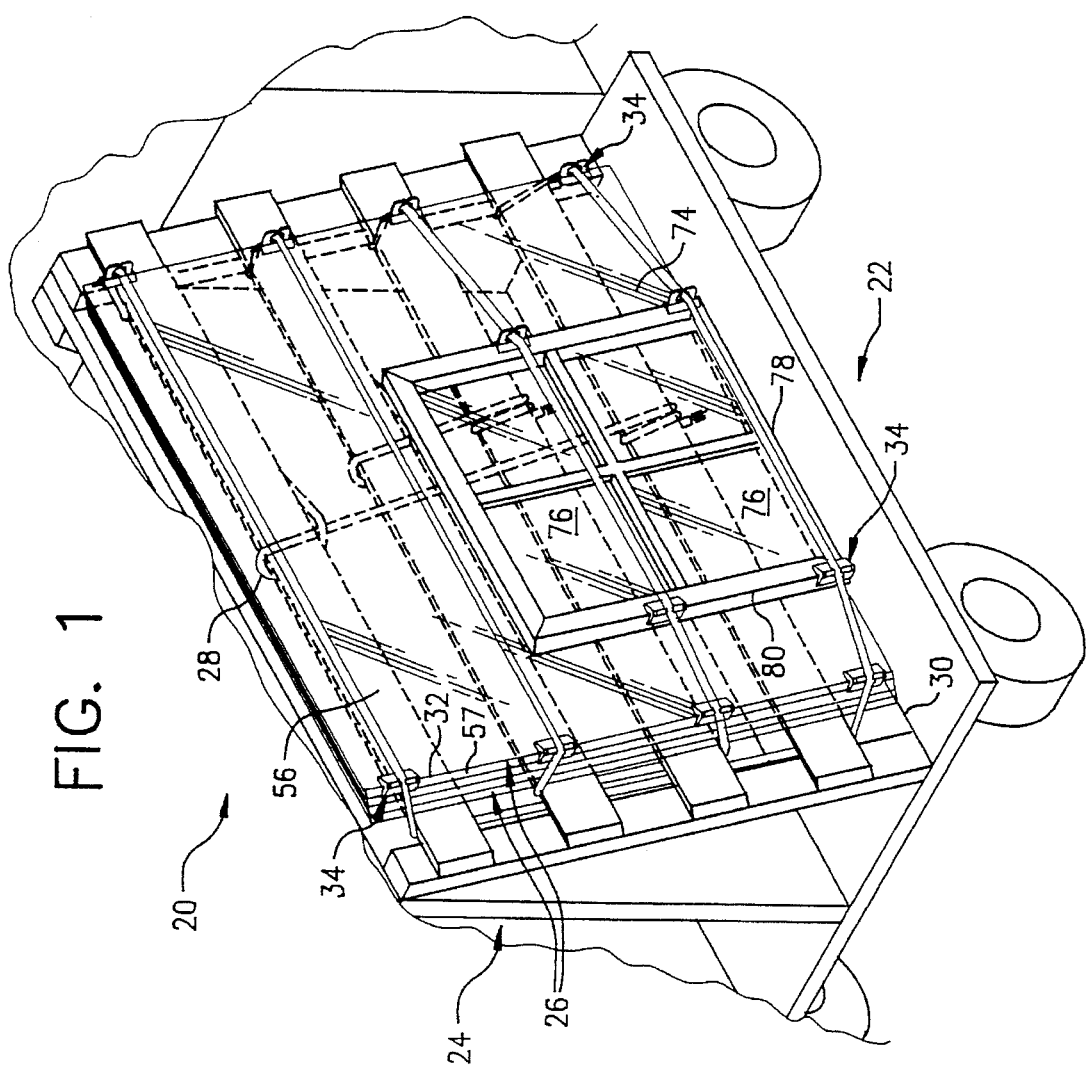
FIG. 1 is a perspective view showing sheets of glass and a window tied to an A-frame support on a truck bed for transport by a flexible restraint and protective devices embodying the principles of the present invention.

Referring now to the drawing, FIG. 1 depicts a truck 20 having a bed 22 on which a conventional A-frame support 24 is mounted. Such trucks are widely used to transport fragile sheets of glass such as those identified by reference character 26 in a safe, upright position.

A rope 28 is employed to tie the sheets of glass 26 to the sides 30 of support 24. Without more, the vibration and jarring of support 24 during transport would cause rope 28 to move relative to those sharp corners 32 of the sheets 26 of glass around which the rope is trained. This can seriously damage the rope or, in an aggravated situation, cause it to part, allowing the load to come loose from support 24. The unpleasant consequences of this happening include loss of the load, sprinkling of a busy street with shards of glass, etc.

In systems employing the principles of the present invention, this deleterious contact is prevented, and damage to the rope or other flexible restraint avoided, by interposing protective devices 34 between the rope 28 and sheets 26 of glass at those corners 32 where the rope would otherwise come into contact with the glass. One of these several identical protective devices 34 is illustrated in detail in FIG. 2.

Protective device 34 is a unitary structure fabricated as by molding from a rigid or semirigid polyvinyl chloride or comparable material. Protective device 34 has a Y-shaped cross-sectional configuration defined by integral, generally parallelepipedal legs 6 and 38 and a keeper 40. Legs 36 and 38 meet in a corner segment 42, and they are oriented at equal angles $\alpha$ with respect to the plane of symmetry 44 of protective device 34.

Keeper 40 also has a parallelepipedal configuration. The midplane of keeper 40 is coincident with plane of symmetry 44, and the inner edge 46 of the keeper is integral with legs 36 and 38 at corner 42.

An elongated aperture 48 with rounded, abrasion reducing ends 50 and 52 is formed through keeper 40. The load securing flexible restraint, in this case rope 28, is trained through aperture 48. This results in rope 28 being isolated from the sharp corner 32 of sheet 26 by corner segment 42 of the device.

Figure 2:
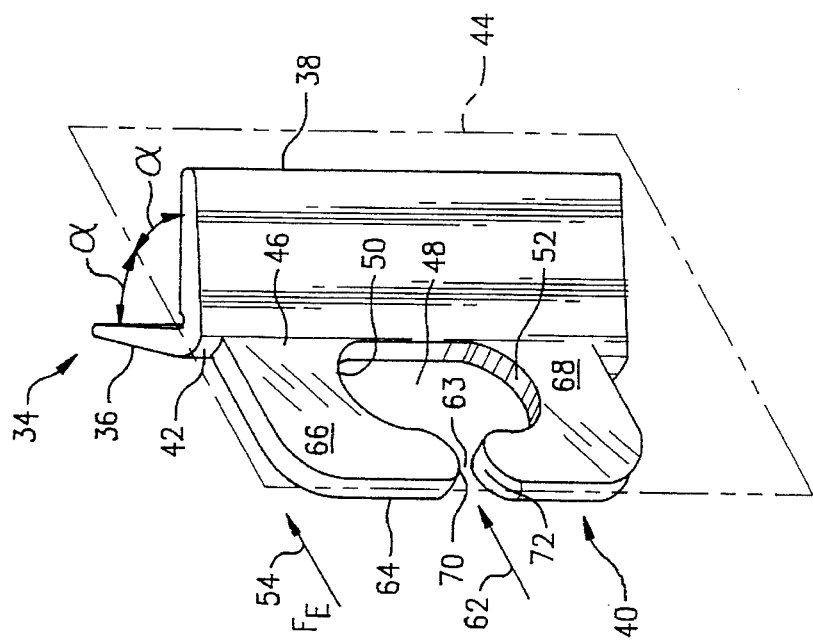
FIG. 2 is a perspective view of the protective device employed in the tie-down system of FIG. 1.

As rope 28 is tightened, a force $F_E$ with a vector in the direction indicated by arrow 54 in FIG. 2 is exerted on protective device 34. This clamps the protective device against the corner 32 of sheet 26, securing it firmly in place due to the large areas of contact between the two legs 36 and 38 of the protective device and the intersecting surfaces 56 and 57 of sheet 26 which those legs engage. This keeps the protective device from slipping, thereby minimizing that the possibility that rope 28 might loosen with consequent damage to the sheets of glass 26 being transported.

As is shown in FIG. 8, the angle $2\alpha$ between the legs 36 and 38 of protective device 40 may be smaller than the right or acute angle $\beta$ between those intersecting surfaces 58 and 59 of window 60 which meet in corner 61. The application of a load with a vector $F_E$ by a restraint (not shown) passing through the aperture 48 in keeper 40 as the restraint is tightened therefore spreads legs 36 and 38 into contact with window surfaces 58 and 59. The restorative force generated in the protective device by the spreading of legs 36 and 38 enhances the clamping of the protective device to surfaces 58 and 59 of window 60.

Protective device 34 is practical because it need not be threaded over one end of rope 28 and then run along that component to the wanted location as is the case with heretofore proposed protective devices such as those disclosed in the above-cited Demers patent. Instead, the rope is installed in aperture 48 simply by displacing it in the direction indicated by arrow 62 in FIG. 2 through an integral, slitlike segment 63 of aperture 48. This slit opens onto the exposed edge 64 of keeper 40. Thus, the protective device can be assembled to rope 28 directly at the location where it is to be employed, a task which can be easily and very quickly completed.

Referring still to FIG. 2, the keeper 40 of protective device 34 has two, longitudinally extending, integral, elongated segments or legs 66 and 68 which parallel corner segment 42 at the intersection of protective device legs 36 and 38 and are connected thereto along corner segment 42. These keeper segments terminate in opposite ends 70 and 72 which define the opposite sides of slit 63. Keeper elements 66 and 68 keep rope 28 from being dislodged from aperture 48 even if the rope and protective devices 34 are roughly handled during the tying down and removal of glass 26 and during the transport of the sheets of glass. Aside from the obviously more secure assembly of the load to frame 24 it provides, this protection against dislodgement makes it practical to leave protective devices 34 on rope 28 once it is removed. Thus, when rope 28 is again employed, it is not necessary to reinstall the previously used protective devices; they will already be in place and can be readily slid along the rope to appropriate locations, if necessary.

In that application of the present invention shown in FIG. 1 and as so far discussed, protective devices 34 are employed to protect rope 28 against damage. An alternate, or additional, function may be to protect an artifact from damage. This may be, for example, the window 74 illustrated in FIG. 1. That window consists of panes 76 of glass in a wooden frame 78 which might be dented, abraded, or otherwise damaged by rope 28 being tightened against corners such as that identified by reference character 80 or by the rope shifting up-and-down or back-and-forth across these corners during transport and/or during the tying of window 74 to A-frame support 24.

By installing protective devices 34 between rope 28 and frame 78 at corner 80 and any other corners over which the rope is trained, this unwanted, damaging contact between frame 78 and the rope is eliminated.

Referring still to the drawing, FIG. 3 shows how flexible straps 90 and protective devices 92 embodying the principles of the present invention may be employed to bundle sheets 94 of plywood, glass, dry wall, or the like into a structurally integral, easily handled unit 96. The protective devices are employed at the several corners 98 of unit 96 contacted by straps 90 to protect sheets 94 against damage. If it is glass or other hard material with a sharp edge that is being bundled, devices 92 also protect flexible straps 90 against damage.

For the most part, the protective devices 92 shown in FIG. 3 and, in more detail, in FIG. 4 are duplicates of the protective devices 34 discussed above and illustrated in FIG. 2. To this extent, the same reference characters have been employed to identify like elements of the two protective devices.

Protective device 92 differs from its FIG. 2 counterpart primarily in that its keeper 100 consists of two, integral, independent, L-shaped elements 102 and 104. Each of these elements is integrated at the inner end 106 of an outwardly directed leg 108 with the corner segment 42 of the protective device. The two L-shaped components of the protective device are spaced along the longitudinal axis 110 of the device toward its opposite ends 112 and 114.

Each of the two keeper components 102 and 104 has a second leg 116 paralleling, and spaced from, the strap engageable corner segment 42 of the device. The two L-shaped components 102 and 104 and corner segment 42 thereby cooperate to define a generally rectangular aperture 118 for a strap or web 90 of the character illustrated in FIG. 3. Strap 90 is installed in a manner akin to that discussed above in conjunction with the FIG. 1 protective device in aperture 118 through an externally accessible segment 120 of the aperture. This segment is bounded by the opposite, exposed ends 122 and 124 of keeper element legs. Because this segment of the aperture is much narrower than the installed strap 90, the longitudinally extending, facing legs 116 of keeper components 102 and 104 cooperate to keep protective device 92 from being dislodged from the strap during transportation, bundling, and removal of the strapping. This remains true even if the straps and protective devices are subjected to strong vibrations, jarring, and rough handling.

Like its FIG. 2 counterpart 34, protective device 92 is firmly clamped against the sheet 94 it contacts in the arrow 54 direction to prevent slipping as straps 90 are tightened.

Yet another representative application of the present invention, discussed briefly above, is the use of flexible restraints and protective devices embodying the principles of the present invention to hold in an assembled and operative spatial relationship the components of a shelving, scaffolding, or other system. One representative example is the use of such a system to hold together the tubular, horizontal and vertical components 126 and 128 of the structural framework 130 illustrated in FIG. 5. In this illustrated arrangement, components 126 and 128 are held together with flexible ropes or cables 132. Protective devices 134 employing the principles of the present invention keep restraint 132 from slipping along the horizontal and vertical columns 126 and 128 around which they are trained and, additionally, protect the restraints 132 and columns 128 from damage. Again, the protective devices are much like the one described above and illustrated in FIG. 2; and the same reference characters will therefore be employed to the extent that this is appropriate.

Protective device 134 differs from its FIG. 2 counterpart primarily in that the two parallelepipedal, angularly related legs 36 and 38 of the latter are replaced by a single, integral, arcuate leg component 136. This artifact engaging component has integral, mirror image related segments 138 and 140 on opposite sides of the plane of symmetry 44 of protective device 134.

In a manner akin to that described above in conjunction with the FIG. 2 embodiment of the invention, the inner edge 46 of keeper 40 is integrated with arcuate leg segment 136. The keeper extends outwardly at right angles from the leg segment at a location making its midplane coincident with the protective device plane of symmetry 44.

Typically, the radius $R_1$ of the protective device leg 136 will be somewhat smaller than the external radius $R_2$ of the tubular component 126 or 128 to which the protective device is assembled. With the protective device thus configured and fabricated from a semirigid material such as an appropriate polyvinyl chloride, the two segments 138 and 140 of the protective device leg 136 will spread apart as the restraint 132 trained through the aperture 48 of the device is tightened and a force consequently applied to that device in the arrow 54 direction (see FIG. 7). As this occurs, leg segments 138 and 140 are spread from the positions shown in solid lines in FIG. 7 to those positions shown in phantom lines. This has two salutary effects. First, it produces contact between the protective device leg and the external surface 142 of the tubular component 126 or 128 over an area coincident with the area of the inner side 144 of leg 36. This maximizes slippage resisting friction between the protective device and the column. Second, the segments 138 and 140 of protective device leg 136 will tend to restore to the illustrated full line positions. These restorative forces further increase the friction between the protective device leg component 136 and tubular component 126 or 128. This further and significantly reduces the tendency of the protective device to slip.

Other configurations can of course be employed to match a protective device such as that identified by reference character 134 to components with elliptical and other configurations.

The invention may be embodied in many forms without departing from the spirit or essential characteristics of the invention. The present embodiments are therefore to be considered in all respects as illustrative and not restrictive, the scope of the invention being indicated by the appended claims rather than by the foregoing description. All changes which come within the meaning and range of equivalency of the claims are therefore intended to be embraced therein.

What is claimed is:

1. A protective device having a Y-like configuration in cross section in combination with a restraint and comprising: integral, elongated, first and second, artifact-engageable leg means and a keeper means connected with said first and second leg means, said keeper means having a parallelepipedal configuration defined by a pair of substantially parallel first edges and a pair of substantially parallel second edges, one said edge of said keeper means being integrated with said first and second leg means at a juncture therebetween such that angles formed between said keeper means and each of said first and second leg means respectively are essentially equal, a restraint-receiving aperture formed in said keeper means in which a flexible restraint can be confined, a restraint positioned within the restraint-receiving aperture and having a width dimension, the restraint-receiving aperture including an elongated restraint-confining cavity and a narrow mouth which communicates with the restraint-confining cavity and which opens onto another said edge of said keeper means and thereby allows the restraint to be installed directly in the keeper means at a particular location of the keeper means along the restraint by displacing the restraint through said mouth and into the restraint-confining cavity, the mouth having a width narrower than the width dimension of the restraint, and said keeper means having complementary, elongated, integral restraint-trapping elements arranged in a mirror image relationship, said restraint-trapping elements having exposed, rounded ends which bound and define opposite sides of said mouth and are so spaced as to confine the restraint in said restraint-receiving aperture, said restraint-trapping elements also having edges which bound the restraint-confining cavity in said keeper means such that said elements are adapted to intercept the restraint and limit movement of the restraint away from said first and second leg means.

2. A protective device and restraint as defined in claim 1 in which the first and second leg means are defined by integral, mirror-image, arcuate segments.

3. A protective device and restraint as defined in claim 1 in which the first and second leg means are defined by first and second rectangular segments that are connected along respective edges thereof to define a corner.

4. A protective device and restraint as defined in claim 1 in which the first and second leg means are deformable to conform to a surface of an artifact with which the device can be associated when in use.

5. A device and restraint as defined in claim 1 wherein said protective device has a plane of symmetry, said keeper means lying along said plane of symmetry and said first and second leg means having an equiangular relationship with said plane of symmetry.

* * * * *